May 19, 1931. J. D. SARTAKOFF 1,805,849
LIQUID LEVEL INDICATING SYSTEM
Filed Nov. 10, 1926 2 Sheets-Sheet 1

INVENTOR.
Jack D. Sartakoff
BY
ATTORNEY

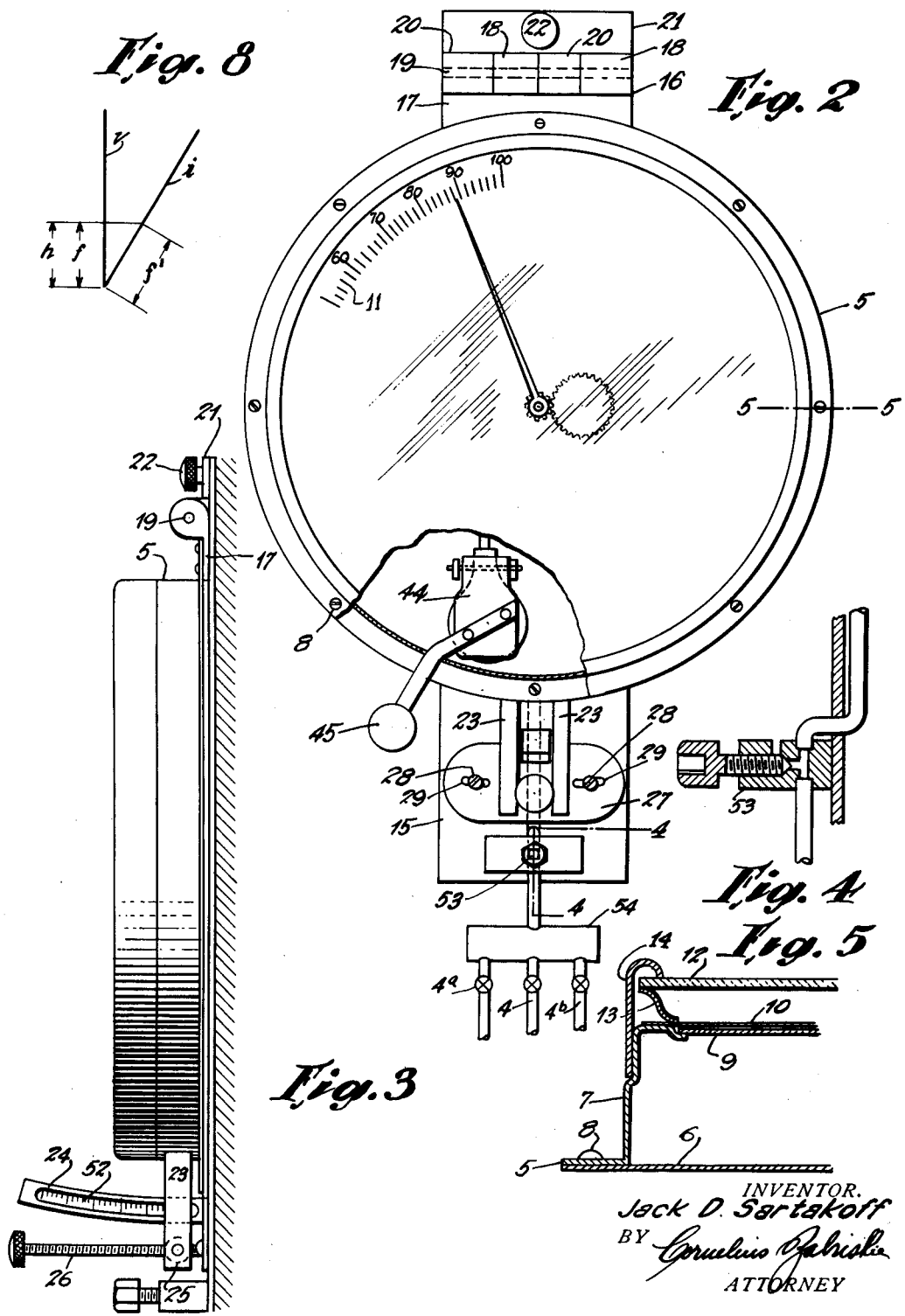

Patented May 19, 1931

1,805,849

UNITED STATES PATENT OFFICE

JACK D. SARTAKOFF, OF NEW YORK, N. Y., ASSIGNOR, BY MESNE ASSIGNMENTS, TO KHETAH CORPORATION, OF NEW YORK, N. Y., A CORPORATION OF NEW YORK

LIQUID LEVEL INDICATING SYSTEM

Application filed November 10, 1926. Serial No. 147,443.

This invention is a liquid level indicating system adapted more particularly for the indication of the level of liquids contained in closed tanks.

The object of the invention is to provide simple, efficient and thoroughly reliable indicating means, wherein atmospheric conditions and changes in temperature will not cause false readings.

A further object is to provide an indicating system adapted to indicate, with the same high degree of accuracy, the levels of liquids of different specific gravities.

Speaking generally, the system of this invention embodies a pressure bell or cylinder adapted to extend vertically downwardly into the tank containing the liquid to be measured and to a point adjacent the bottom of the tank. The lower end of the bell is open, while the upper end of such bell is connected by means of a suitable conduit to apparatus operable by fluid pressure to effect the indication of the liquid level.

This latter apparatus preferably embodies a reservoir and a float chamber connected at their bottoms by a trap and which reservoir, float chamber and trap contain a suitable relatively heavy liquid, e. g., mercury. The mercury fills the trap and normally forms a seal between the reservoir and the float chamber. A float is positioned within the float chamber and is operatively connected by any suitable means to a spindle, and a pointer, fixed on the spindle, is operable over a graduated scale in accordance with the movements of the float.

With this arrangement, the hydrostatic pressure of the liquid in the tank will place the air or other fluid in the bell under pressure equivalent and corresponding to such hydrostatic pressure and this fluid pressure will be communicated through the conduit to the reservoir and be imposed upon the surface of the mercury contained therein. The communication of such pressure to the mercury in the reservoir will bring about a flow of the mercury from the reservoir into the float chamber and the mercury level will rise in the float chamber until the weight of the column of mercury therein will balance the fluid pressure in the pressure bell. This level of the mercury in the float chamber will control the position of the float and consequently control the position of the pointer with reference to the scale.

Connected to the reservoir, below the mercury level therein is a fluid supply duct which leads to any suitable means for supplying fluid under pressure. Fluid under pressure from this source of supply is adapted to be fed through the duct to bubble up through the mercury into the upper portion of the reservoir above the mercury level and in practice the building up of such fluid pressure is continued, when a reading is desired, until such pressure substantially balances the hydrostatic pressure of the liquid in the tank.

It will of course be understood that the pressure built up within the reservoir, as described, is communicated through the conduit to the pressure bell and is exerted upon the surface of the liquid column contained therein until such fluid pressure is sufficient to force the liquid column to the lower open end of the bell. If the feed of fluid under pressure to the reservoir is continued, this pressure will merely force its way out of the bottom of the bell and such excess fluid will bubble up through the liquid in the tank, so that at no time can the pressure within the bell exceed the hydrostatic pressure of the liquid.

By thus supplying fluid under pressure to the reservoir, there will ultimately be built up in the reservoir a pressure equal to the hydrostatic head and this pressure will be exerted upon the mercury in the reservoir to cause a flow of such mercury into the float chamber as described, the elevation of the mercury in the float chamber corresponding to the pressure in the reservoir and pressure bell.

As the mercury level rises in the float chamber, the pointer will advance over the scale and it will continue to advance as the pressure increases, until the pressure is equal to the hydrostatic pressure in the tank, whereupon no further pressure can be built up in the reservoir and the pointer will come to rest and indicate the liquid level.

It is possible that for some abnormal reason, such as kinking of the tube, which constitutes the conduit, the liquid pressure supplied to the reservoir may not be able to exit therefrom. In such event, the supplying of pressure to the reservoir, if continued, would force all of the mercury from the reservoir into the float chamber and might even force all of the mercury out of the float chamber if sufficient pressure were built up. To preclude such occurrence, and, as a safety measure, a safety by-pass is preferably provided whereby, after the pressure has reached a predetermined maximum, the by-pass will be uncovered by the mercury and the pressure will be permitted to by-pass the mercury and exit without damaging the apparatus.

The reservoir, float chamber and directly associated parts normally occupy an upstanding vertical position, but said parts are, in practice, mounted for tilting movement, whereby they may be moved into various inclined positions to accurately adjust the apparatus for the indication of the levels of liquids of different specific gravities. This constitutes an important feature of the present invention, since by unitary indicating means, I am able to measure liquids of different specific gravity by a slight manipulation of such apparatus. The mechanical elements entering into the apparatus of this invention are unusually simple, while the apparatus is absolutely reliable and correct readings are assured.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 2 is a front elevation, partly in section, of the indicating element of such system.

Figure 3 is a side elevation of the element shown in Figure 2.

Figure 4 is a section on the line 4—4 of Figure 2.

Figure 5 is a section on the line 5—5 of Figure 2;

Figures 1, 6, 7:
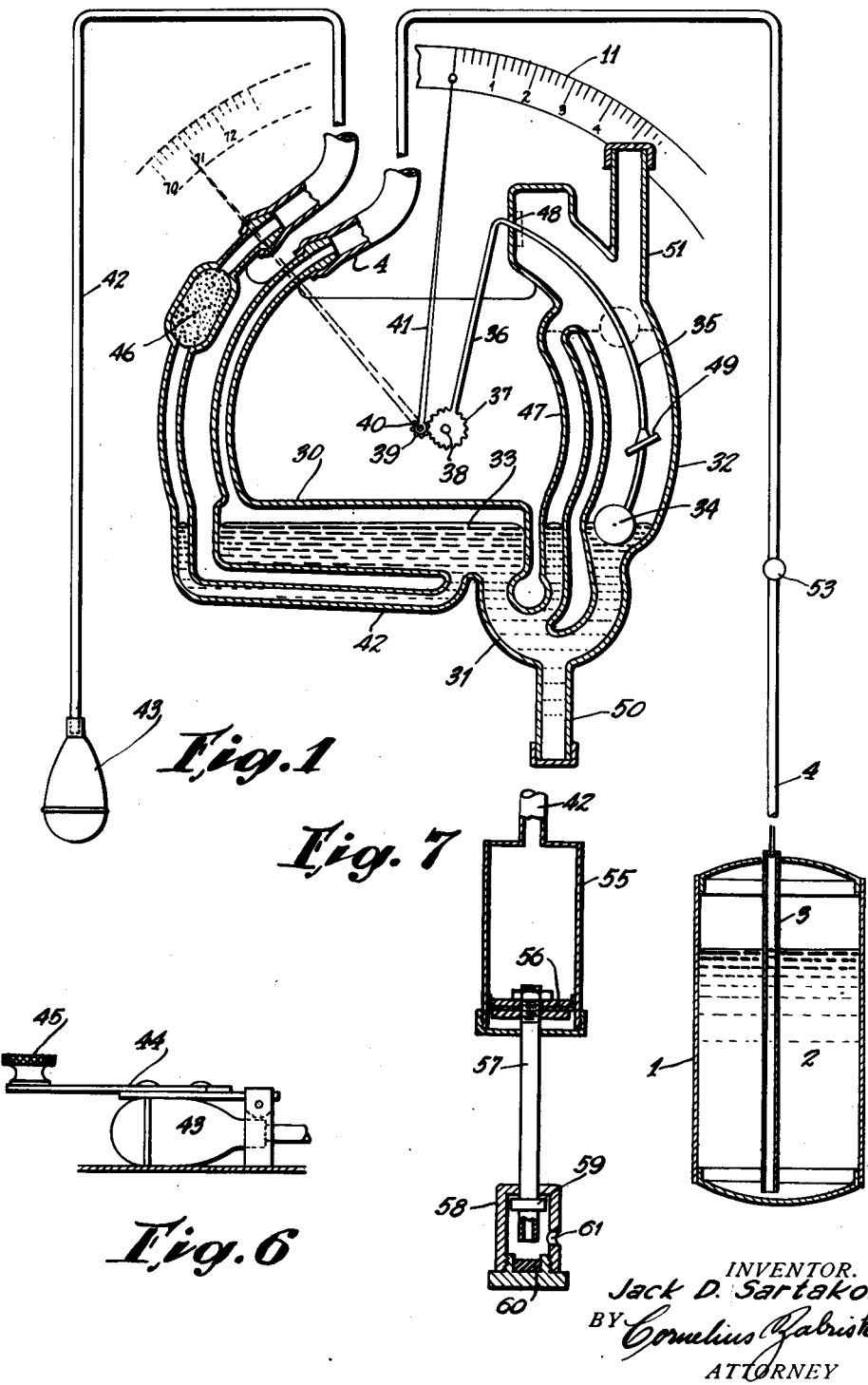
Figure 1 is a diagrammatic view of the system of the present invention.
Figure 6 is a side elevation of means for supplying fluid under pressure.
Figure 7 shows a pump which is preferably employed to provide the air under pressure necessary to operate the indicating instrument; and, Figure 8 is a diagrammatic showing of different positions of which the instrument is susceptible to adapt such instrument to accurately measure liquids of different specific gravities.

Referring to the drawings, 1 indicates any conventional form of tank or vessel containing the liquid 2 to be measured. This tank is vented at its top in any suitable manner and extending downwardly into the tank from the top thereof to adjacent the base of the tank is a pressure bell 3, the lower end of which is open, while the upper end is connected to a tube or conduit 4 extending to the indicating element shown in Figures 2 and 3.

This indicating element embodies a suitable casing 5 of any appropriate construction. As shown, it comprises a back plate 6 to which a housing 7 is secured by means of screws 8. The housing carries at its front a mirror 9 positioned directly below a transparent plate 10 on which is etched or otherwise formed an annular graduated scale 11. A glass cover 12 is spaced from the scale plate 10 by a spacing ring 13 and said cover and ring are held in position by a retaining ring 14, all as clearly shown in Figure 5.

The casing constructed as described is mounted upon a supporting plate 15 by a hinge connection 16, which connection embodies a hinge leaf 17, forming an extension of the back plate 6, and having its free end curled as shown at 18 to embrace a hinge pin 19 carried by the curled end 20 of the hinge leaf 21. This latter leaf is secured to the supporting plate 15 by a single thumb screw 22, as shown in Figs. 2 and 3. This mounting permits of swinging movement of the case upon the hinge pin 19 and also allows of lateral swinging adjustment on the thumb screw 22, which is adapted to lock the parts together after they have been properly adjusted.

The casing is guided for swinging movement on the hinge pin 19 by means of a bracket 23, which depends from the casing and straddles a scale bar 24. The bracket 23 carries near its free end a pivoted nut 25 and an adjusting screw 26 threads through this nut and is rotatably secured to plate 27 on which the scale bar 24 is carried. This plate 27 is secured to the supporting plate 15 by screws 28 which work in slots 29 and permit the pivotal adjustment of the casing on the thumb screw 22. Screws 28 may be tightened when the casing is in lateral adjustment to assist the thumb screw 22 in thus securing the casing against inadvertent lateral movement.

Positioned within the housing and mounted on the back plate 6 of the casing is an instrument operable by pressure communicated to it through the conduit 4 and adapted to translate such pressure into mechanical movements for the purpose of causing a pointer to properly traverse the graduated scale 11.

This instrument embodies a reservoir 30, the bottom of which is connected by means of a trap 31 to the bottom of a float chamber 32 and contained within the reservoir and over the chamber is a body of liquid 33 which, although preferably mercury, may be any suitable liquid.

The mercury 33 is in such quantity that it will normally substantially fill the reservoir and trap and will extend well up into the float chamber. Positioned within the float chamber is a float 34 connected by means of an arcuate stem 35 and a radial arm 36 with a gear 37 positioned within the housing 7 and mounted on a shaft 38 journalled on the back plate 6. This gear 37 meshes with the pinion 39 fixed on a spindle 40, which carries a pointer 41. The spindle extends through the mirror and scale plate and the pointer is positioned between the scale plate and the cover 12 to operate directly over said scale plate and in juxtaposition with the scale 11.

The conduit 4 communicates with the reservoir 30 at the top thereof, as shown in Fig. 1, while from the bottom of said reservoir a duct 42 extends to pressure supply means shown as a bulb 43 in Figs. 1 and 2. With this bulb a pivoted presser foot 44 carrying an operating finger 45 may be associated which, when actuated, serves to press the bulb after the manner of a bellows. Instead of a bellows, I may use a pump and in Fig. 7, a highly efficient and novel form of pump, hereinafter described, is shown. The purpose of the pump or bellows is to supply air under pressure through the duct 42 to the reservoir and a filtering medium 46 may be included in said duct to filter out dust or other impurities which may be contained therein.

It will be noted from Figure 1 that the bellows is positioned within the casing 5, but that the operating finger 45 extends into an accessible position exteriorly thereof, so that it may be readily operated while the operating parts are concealed from view.

The operation is as follows. If it be assumed that the casing is properly adjusted on the supporting plate 15 and rigidly locked in place thereon, the liquid level in the tank 1 may be ascertained by grasping the operating finger 45 and actuating it to operate the bellows. As the bellows is operated, it will supply air under pressure through the duct 42 to the reservoir 30 and such air will bubble up through the mercury contained in the reservoir. At the operation of the bellows is continued, the pressure of the air above the mercury level in the reservoir will increase and this pressure will be communicated through the conduit 4 to the pressure bell 3.

As the pressure increases, the column of liquid contained within the bell will be forced lower and lower until the pressure within the bell equals the hydrostatic pressure of the liquid 2, whereupon pressure within the bell can rise no higher as excess air will pass out through the bottom of the bell and bubble up through the liquid 2.

While equality of pressure is being established between the air in the reservoir 30 and the hydrostatic pressure of the liquid in the tank 1, the air pressure will react against the surface of the mercury in the reservoir 30 and force the mercury to flow in the direction of and into the float chamber 32 until the mercury head in the float chamber will balance the air pressure in the reservoir. In other words, the pressure built up in the reservoir will cause the mercury level to rise in the float chamber and such rise in level will cause a corresponding rise of the float with consequent movement of the pointer 41 over the scale 11. If the parts are properly initially adjusted, it will be found that after the operation of the bellows, the pointer will come to rest at that graduation of the scale corresponding to the liquid level or quantity of liquid in the tank 1. It will be understood, of course, that the scale is graduated appropriately to permit of such readings.

There are times, when, due to stoppage of the conduit, or a too rapid feed of pressure to the reservoir, the air supplied by the bellows to the reservoir may not be permitted to escape through the conduit and out of the tank with sufficient rapidity to preclude an abnormal rise of the mercury level in the float chamber and in order to guard against damage to the apparatus in the event of such a condition, a safety by-pass 47 is provided. It will be noted from Fig. 1 that this by-pass extends from a point in the trap 31 to the upper portion of the float chamber 32. It therefore follows that if excess pressure is applied to the reservoir 30 to such degree that it would force the mercury out through an opening 48 near the top of said chamber, the lowering of the mercury level into the trap will uncover the by-pass 47 and permit the pressure to by-pass the mercury. This is an important safeguard and positively precludes the loss of mercury for the reasons specified.

As a further safety measure, I also preferably provide the float stem 35 with a stopper 49, which will close the opening 48 through which said stem works and preclude the spilling of mercury through this opening in the event that the mercury in the float chamber rises to an abnormal level.

It will be noted that a draw off 50 is provided at the bottom of the trap while a similar extension 51 is provided at the upper portion of the float chamber. Both of these extensions have suitable air tight caps. The purpose of the draw off 50 is to permit of initial calibration of the instrument before it leaves the factory, and after it has been calibrated, the mercury is drawn off through the extension 50 and shipped in a separate container with the instrument. After the instrument is set up in proper position, the mercury is reintroduced through the extension 51, it being understood that the cap of the extension 50 had been previously screwed on sufficiently tight to preclude leakage. By this practical method of shipment, just the right amount of mercury is provided and the installation of the device facilitated.

In setting up the apparatus, the supporting plate 15 is rigidly mounted in the desired position so as to be substantially plumb, and thereafter the casing is brought into adjusted position both laterally and with respect to its position on the pivot 19. This latter adjustment is obtained by operation of the adjusting screw 26 and said adjustment is facilitated by means of the scale 52 on the scale bar 24. This scale is graduated to show specific gravities and by tilting the casing while observing the position of the bracket 23 with reference to this scale, the system may be regulated to correctly register the levels of liquids of widely different specific gravities.

Suppose, for example, that the casing is in such tilted position that the forward edge of the bracket is substantially midway of the ends of the scale 52 and that this adjustment is appropriate to a correct indication of liquids of a predetermined specific gravity. If the device is to be adapted for the measurement of liquids of a lower specific gravity, the casing should be tilted to a further degree, whereas if the device is to be adapted to measure liquids of a higher specific gravity, the casing should be tilted to a lesser degree. In practice, the scale 52 is properly calibrated and is designated to show the inclination which the casing should assume for liquids of any predetermined specific gravity, within the range of the instrument.

This adaptability of the invention to a ready adjustment for liquids of different specific gravities is of marked practical importance and is highly novel. It is rendered possible by the use of a float operating on a substantially rigid stem and arm as specified.

In Fig. 8, $v$ designates the vertical position of the casing, $i$ an inclined position of the casing (greatly exaggerated) and $h$ the difference in mercury levels in the float chamber and in the reservoir. This column $h$ will not change during a tilting of the casing provided that the hydrostatic level in the tank is the same and the specific gravity is constant. It will be apparent, however, that when the casing is vertical, the rise of the float will be equal to a distance $f$ which is equal to the height of the column $h$, whereas, when the casing is tilted, the float will travel, when lifted by the column $h$, a distance $f'$ which, it will be apparent, is greater than the distance $f$. It therefore follows that when the casing is inclined, the float will operate the pointer over a greater distance for a predetermined rise of mercury level in the float chamber than it will when the casing is vertical. It further follows that through a tilting of the casing, the relationship between the rise and fall of mercury level in the float chamber and the graduations of the scale 11 may be varied and by this variation, the indication of liquids of different specific gravities is made possible.

Thus it will be apparent that it will take a higher liquid level in the tank 1 for a liquid of a low specific gravity to produce the mercury column $h$, than it would take a liquid of higher specific gravity to raise the same column, and it further follows that the casing must be tilted to a greater degree for the accurate measuring of liquids of lower specific gravity than for liquids of a higher specific gravity.

Experience has shown that by mounting of the casing for adjustment as described, and by properly calibrating the instrument, very accurate readings or measurements of liquid in the tank 1, can be obtained although such liquids are of different specific gravities.

It will be noted from Figs. 1 and 2, that the conduit 4 which leads from the reservoir 30 to the pressure bell 3 includes a valve 53 which is shown in detail in Fig. 4. The purpose of this valve is to permit of venting of the conduit 4 and the reservoir 30, so as to permit the mercury levels in said reservoir and in the float chamber to assume the same or a zero condition. This will permit of a checking of the instrument and is particularly useful in initial installation, for in order that the pointer will properly cooperate with the scale to give correct readings, the pointer should register zero on the scale when the mercury in the reservoir and float chamber is in zero position. If this condition exists, the indications of the pointer will be correct, but if it does not exist, there is every probability of an erroneous reading. The utilization of the valve 53 permits an accurate adjustment during installation and a check up at subsequent times. If during installation or such check up, it is found that the pointer does not return to zero, correction may be made by loosening the screws 28 and the thumb screw 22 and swinging the casing laterally in one direction or the other until the pointer registers with zero of the scale 11. The screws may now be tightened to leave the parts in proper adjustment.

In practically carrying out the invention, a gauge of the character which I have described may be used with either one or a plurality of tanks. That is to say, there may be a gauge provided for each tank or one gauge may serve to indicate the liquid levels of several tanks individually and in succession.

In Fig. 1 the instrument is shown as connected to a single tank 1. In Figure 2, however, the conduit leading from the reservoir 30 extends to a header 54 with which are connected several valved pipes or conduits leading to a like number of tanks. Of these conduits one is the conduit 4 leading to the tank 1, while the others 4a, 4b, etc. of which there may be any appropriate number lead to other tanks 1a, 1b, etc. (not shown).

With this arrangement, any one of the tanks in question may be operatively associated with the gauge by operating the valve in the appropriate conduit to open communication between the tank in question and the header 54, while the valves of the other conduits remain closed.

I have hereinbefore referred to the pump shown in Fig. 7 as adapted for use in supplying air under pressure to the reservoir 30, in lieu of the bellows which has been particularly described. In practice, I prefer to use a pump of the character shown in Fig. 7. This pump embodies a cylinder 55, one end of which is connected with the air supply duct 42. A piston 56 is operable within the cylinder and is provided with a tubular stem 57, the passage through which communicates unobstructedly with the interior of the cylinder head of the piston.

On the outer end of the stem is mounted an operating handle 58 which is shown as hollow and is precluded from disengagement from the stem by a fixed collar 59 mounted on the stem. Beyond the free end of the stem and positioned interiorly of the handle is a yieldable seat 60 which, when the handle is in engagement with the collar 59, is disengaged from the end of the stem. If, however, the handle is grasped for the purpose of forcing the piston in a forward direction to compress air within the cylinder, the seat 60 will engage with the end of the stem and seal the passage therethrough, so that as pressure is applied to the handle to compress air within the cylinder, the escape of air through the stem is precluded. After the compression stroke, however, is completed and the operator pulls on the handle to retract the piston, the seat 60 is automatically retracted from the end of the stem 57, so that as the piston is retracted air is adapted to enter through a vent 61 in the handle and pass through the tubular stem 57 into the cylinder. The size of the vent 61 and the cross section of the passage through the stem are sufficiently large to supply air to the cylinder rapidly so that no appreciable suction is transmitted through a relatively small duct 42 to the mercury contained in the reservoir. This form of pump embodies a highly novel construction and is particularly adapted for use with the instrument of the present invention, wherein it is highly desirable that during the operations of the pump, no suction be applied to the mercury in the reservoir.

It will be apparent from the foregoing detailed description of the invention that the mechanical parts entering into the construction are simple and may be economically manufactured. The construction and mode of operation, however, are such that the level indications will be absolutely correct. These indications may be in terms of gallons or inches, or otherwise, as may be desired. The principle underlying the mode of operation is fundamentally sound and the mode of applying the principle differs radically from all prior practice.

I am aware that it has heretofore been proposed to balance a liquid column against the hydrostatic pressure of a liquid head, but in practically all of the prior devices, the continued operation of pumps or other pressure supplying devices is essential during the obtaining of a reading. In other words, the supply of pressure must be continued without cessation, while a reading is being obtained, and, in practice, this presents serious difficulty as it is difficult to obtain such pressures without pulsation or variations of pressure.

In the present invention no such difficulties are encountered. The pressure to which the mercury is subjected is introduced through a mercury seal, so that after sufficient pressure has been built up to equal the hydrostatic head of the liquid to be measured, the pointer will remain steady and at this point for an indefinite period, so that a reading may be taken deliberately and without danger of a false reading.

It may be true that during the actual application of pressure, there may be vibration of the pointer, but as soon as the bellows or pump cease to operate the pointer will invariably come back to the same reading provided that the liquid level in the tank remains the same. The practical importance of this feature will be apparent.

I wish to further point out that the pressure introduced between the body of mercury and the pressure bell does not pass through the float chamber nor does it pass through that portion of the mercury which actually engages with the float or directly accomplishes the indication through the float. As a matter of fact, no pressure which is employed to raise and maintain the column in the float chamber passes through the trap 31. The flow of pressure is invariably through the mercury contained in the float chamber unless, of course, there is an excess pressure which is by-passed through the by-pass 47, but in such a case this excess pressure is not employed to effect the indication. These features are important, in practice, as they insure maximum efficiency and the maximum speed of operation in obtaining proper indications.

I also consider of marked importance the utilization of the float cooperable with the mercury column in the float chamber to operate a pointer, for it is this construction which adapts the instrument for correct readings of liquids of different specific gravities.

The foregoing detailed description sets forth the invention in its preferred practical form, but the invention is to be understood as fully commensurate with the appended claims.

Having thus fully described the invention, what I claim as new and desire to secure by Letters Patent is:

1. In a liquid level indicating system, a pressure cylinder adapted to extend into the body of the liquid to be measured, in combination with an indicating instrument embodying a suitable casing, means for mounting the casing for pivotal adjustment on two distinct axes which are perpendicular to one another, a reservoir and a float chamber mounted within the casing and having a trapped connection with one another, a graduated scale associated with the casing, a pointer pivoted to the casing to traverse the scale, a float positioned within the float chamber, means operatively connecting the float with the pointer, whereby the rise and fall of liquid in the float chamber will cause the pointer to be operated, a body of liquid contained conjointly in the reservoir and float chamber, means for connecting the pressure cylinder with the reservoir, and means for introducing air under pressure into the reservoir and pressure cylinder in sufficient amount to substantially balance the hydrostatic pressure of the liquid to be measured, whereby a corresponding liquid head is established in the float chamber and the pointer operated accordingly.

2. In a liquid level indicating system, a pressure cylinder adapted to extend into the body of the liquid to be measured, in combination with an indicating instrument embodying a suitable casing, means for mounting the casing for pivotal adjustment on two distinct axes which are perpendicular to one another, a reservoir and a float chamber mounted within the casing and having a trapped connection with one another, a graduated scale associated with the casing, a pointer pivoted to the casing to traverse the scale, a float positioned within the float chamber, means operatively connecting the float with the pointer, whereby the rise and fall of liquid in the float chamber will cause the pointer to be operated, a body of liquid contained conjointly in the reservoir and float chamber, means for connecting the pressure cylinder with the reservoir, and means for introducing air under pressure into the reservoir and pressure cylinder in sufficient amount to substantially balance the hydrostatic pressure of the liquid to be measured, whereby a corresponding liquid head is established in the float chamber and the pointer operated accordingly, and means for tilting the casing into different angular relations to a vertical plane on one of said axes for the purpose of varying the inclination of the path of movement of the liquid to vary the ratio of movement of the float to a rise and fall of the liquid level in the float chamber as may be necessary for accurate indication of liquids of different specific gravities, said casing being pivotally adjustable on the other axis to regulate the normal liquid levels in the reservoir and float chamber.

3. A liquid level indicator embodying a float chamber, a reservoir containing liquid and connected to the chamber below the liquid level therein with the chamber, said reservoir having a pressure inlet below the liquid level therein and a pressure connection above said liquid level, a scale, a pivoted pointer movable over the scale, a pinion attached to the pointer, a gear meshing with the pinion, an arm attached to the gear and extending for a portion of its length in a radial direction and curved for the remainder of its length on the arc of a circle the center of which is in the axis of the gear, a float secured to the free end of said curved portion of the arm to float at the surface of the liquid in said chamber, whereby the pointer is operable by the float through relatively great leverage fully sufficient to overcome the friction of the operating parts.

4. A liquid level indicator embodying a float chamber, a reservoir containing liquid and connected to the chamber below the liquid level therein with the chamber, said reservoir having a pressure inlet below the liquid level therein and a pressure connection above said liquid, a scale, a pivoted pointer movable over the scale, a pinion attached to the pointer, a relatively large gear meshing with the pinion, an arm attached to the gear and extending for a portion of its length in a radial direction and curved for the remainder of its length on the arc of a circle the center of which is in the axis of the gear, a float secured to the free end of said curved portion of the arm to float at the surface of the liquid in said chamber, whereby the pointer is operable by the float through relatively great leverage fully sufficient to overcome the friction of the operating parts, and through step-up gearing to produce relatively extensive movement of the pointer corresponding to relatively small changes in elevation of the float.

5. A liquid level indicator embodying a float chamber, a reservoir containing liquid and having a trapped connection with the float chamber to supply liquid to the latter, said reservoir being of relatively great horizontal cross sectional area as compared to its height so that the liquid therein is in the form of a relatively extensive shallow pool, a pressure connection to the reservoir above the surface of said pool and a relatively small pressure inlet below the surface of said pool, whereby dynamic pulsation of the liquid in the float chamber during introduction of pressure through said inlet is eliminated to permit precision of measurement, a scale, a pivoted pointer movable over said scale, a pivoted arm having a portion curved on the arc of a circle, gearing connections between one end of the arm and the pointer, and, at the other end of said arm, a buoyant body floating at the surface of the liquid in the float chamber.

6. A liquid level indicator embodying a suitable dial provided with a graduated scale, a pointer pivotally mounted to move over said scale, a float arm pivoted adjacent the pivot of the pointer, gearing connections between the float arm and the pointer, said float arm extending in a radial direction for a distance, and then curved on the arc of a circle for the remainder of its length, a float on the free end of said arm, the center of curvature of the curved portion of the arm being in the axis of its pivotal movement, an upstanding float chamber curved on the same center as the curved portion of the arm and provided in its wall with an opening through which the curved portion of the arm extends into the interior of the float chamber and carries the float interiorly of said chamber, a reservoir containing liquid and having a trap connection with the float chamber to supply liquid thereto, and said reservoir being provided with a pressure inlet and a pressure connection.

7. A liquid level indicator embodying a suitable dial provided with a graduated scale, a pointer mounted to move over the scale, a float arm pivoted adjacent the pivot of the pointer, gearing connections between the float arm and the pointer, an upstanding float chamber longitudinally curved, and of relatively small cross section area, a reservoir containing liquid and having a trap connection with the bottom of the float chamber, said reservoir being provided with a pressure inlet below the liquid level therein, and a pressure connection above the liquid level therein, a float in the float chamber and connected to the float arm, said float arm extending in a radial direction from its pivot for a distance and then longitudinally curved for the remainder of its length, so as to extend into and operate within the float chamber, the free end of the float arm being secured to the float.

In testimony whereof I have signed the foregoing specification.

JACK D. SARTAKOFF.